US009714577B2

(12) United States Patent
Kington et al.

(10) Patent No.: US 9,714,577 B2
(45) Date of Patent: Jul. 25, 2017

(54) GAS TURBINE ENGINE ROTORS INCLUDING INTRA-HUB STRESS RELIEF FEATURES AND METHODS FOR THE MANUFACTURE THEREOF

(71) Applicant: HONEYWELL INTERNATIONAL INC., Morristown, NJ (US)

(72) Inventors: Harry Lester Kington, Scottsdale, AZ (US); Brian Hann, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 851 days.

(21) Appl. No.: 14/062,611

(22) Filed: Oct. 24, 2013

(65) Prior Publication Data
US 2015/0118048 A1 Apr. 30, 2015

(51) Int. Cl.
*F01D 5/02* (2006.01)
*F01D 5/04* (2006.01)
(Continued)

(52) U.S. Cl.
CPC .............. *F01D 5/147* (2013.01); *B22C 9/04* (2013.01); *B22D 25/02* (2013.01); *B22F 3/15* (2013.01); *B22F 5/009* (2013.01); *B23P 15/006* (2013.01); *F01D 5/04* (2013.01); *F01D 5/048* (2013.01); *F01D 5/34* (2013.01); *B22F 2005/103* (2013.01); *F05D 2230/21* (2013.01);
(Continued)

(58) Field of Classification Search
CPC ... F01D 5/02; F01D 5/021; F01D 5/04; F01D 5/048; F01D 5/147; F01D 5/34; B22F 3/1121; B22F 3/15; B22F 5/009

USPC ........................................................ 416/181
See application file for complete search history.

(56) References Cited

U.S. PATENT DOCUMENTS 737,042 A * 8/1903 Stumpf ................ F04D 25/088
415/9
2,941,780 A 6/1960 Von Der Nuell et al.
(Continued)

FOREIGN PATENT DOCUMENTS

DE 3802763 A1 8/1989
EP 1978208 A2 10/2008
(Continued)

OTHER PUBLICATIONS

EP Extended Search Report for Application No. EP 15 186 069.9, dated Feb. 17, 2016.
(Continued)

*Primary Examiner* — Sean J Younger
(74) *Attorney, Agent, or Firm* — Lorenz & Kopf, LLP (57) ABSTRACT

Embodiments of a gas turbine engine rotor including stress relief features are provided, as are embodiments of method for producing a gas turbine engine rotor. In one embodiment, the method includes producing a hub preform in which a plurality of elongated sacrificial cores are embedded. Blades are attached to an outer circumference of the hub preform by, for example, bonding a blade ring to the outer circumference of the preform. The blades are spaced about the rotational axis of the gas turbine engine rotor and circumferentially interspersed with the plurality of elongated sacrificial cores. The plurality of elongated sacrificial cores are then removed from the hub preform to yield a plurality of stress distribution tunnels extending in the hub preform.

18 Claims, 8 Drawing Sheets

(51) Int. Cl.
*F01D 5/34* (2006.01)
*B22F 3/15* (2006.01)
*F01D 5/14* (2006.01)
*B22C 9/04* (2006.01)
*B22D 25/02* (2006.01)
*B22F 5/00* (2006.01)
*B23P 15/00* (2006.01)
*B22F 5/10* (2006.01)

(52) U.S. Cl.
CPC .... *F05D 2230/50* (2013.01); *F05D 2260/941* (2013.01); *Y10T 29/49321* (2015.01)

(56) References Cited

U.S. PATENT DOCUMENTS

| | | | |
|---|---|---|---|
| 3,291,446 A * | 12/1966 | Huebner, Jr. | F01D 5/021 |
| | | | 416/181 |
| 3,399,443 A | 9/1968 | Roy et al. | |
| 3,847,506 A * | 11/1974 | Straniti | F01D 5/10 |
| | | | 416/244 A |
| 3,927,952 A | 12/1975 | Kirby | |
| 4,062,638 A | 12/1977 | Hall, Jr. | |
| 4,183,456 A | 1/1980 | Schilling et al. | |
| 4,335,997 A | 6/1982 | Ewing et al. | |
| 4,383,854 A | 5/1983 | Dembowski | |
| 4,659,288 A | 4/1987 | Clark et al. | |
| 4,723,999 A | 2/1988 | Hasselstrom | |
| 4,813,848 A * | 3/1989 | Novotny | F01D 5/081 |
| | | | 416/213 R |
| 4,886,535 A | 12/1989 | Bhatti | |
| 5,066,454 A | 11/1991 | Hanson | |
| 5,269,058 A | 12/1993 | Wiggs et al. | |
| 5,292,385 A * | 3/1994 | Kington | F01D 5/02 |
| | | | 148/404 |
| 5,469,618 A | 11/1995 | LeMonds et al. | |
| 5,854,966 A | 12/1998 | Kampe et al. | |
| 6,120,570 A | 9/2000 | Packer | |
| 7,097,422 B2 * | 8/2006 | Rice | B23H 9/10 |
| | | | 415/134 |
| 7,112,301 B2 | 9/2006 | Thorne et al. | |
| 7,163,121 B1 | 1/2007 | Stouffer et al. | |
| 7,261,855 B2 | 8/2007 | Troitski et al. | |
| 7,481,625 B2 | 1/2009 | Kim | |
| 7,641,847 B2 | 1/2010 | Voice et al. | |
| 7,687,021 B2 | 3/2010 | Imbourg et al. | |
| 7,832,986 B2 | 11/2010 | Baker et al. | |
| 7,887,299 B2 * | 2/2011 | Xiao | F01D 5/10 |
| | | | 416/203 |
| 7,900,811 B1 | 3/2011 | Alman et al. | |
| 8,157,514 B2 * | 4/2012 | Reyes | F01D 5/26 |
| | | | 415/199.4 |
| 8,206,122 B2 | 6/2012 | Rojanskiy et al. | |
| 8,408,446 B1 | 4/2013 | Smoke et al. | |
| 2002/0122738 A1 | 9/2002 | Van Daam et al. | |
| 2008/0115358 A1 | 5/2008 | Rice | |
| 2008/0304974 A1 | 12/2008 | Marshall et al. | |
| 2009/0119919 A1 * | 5/2009 | Kington | B23P 15/006 |
| | | | 29/889.7 |
| 2009/0226338 A1 | 9/2009 | Troitski et al. | |
| 2011/0182745 A1 * | 7/2011 | Suciu | F01D 5/084 |
| | | | 416/234 |
| 2012/0160900 A1 | 6/2012 | Rigal et al. | |
| 2012/0308381 A1 * | 12/2012 | Suciu | F01D 5/084 |
| | | | 415/220 |
| 2013/0202476 A1 | 8/2013 | Hellman et al. | |
| 2013/0272882 A1 * | 10/2013 | Mittendorf | F01D 5/04 |
| | | | 416/175 |

FOREIGN PATENT DOCUMENTS

| | | |
|---|---|---|
| EP | 2058474 A2 | 5/2009 |
| EP | 2230382 A2 | 9/2010 |
| EP | 2650474 A2 | 10/2013 |
| EP | 2865482 A1 | 9/2015 |
| FR | 1122205 A | 9/1956 |
| GB | 1458524 A | 12/1976 |
| WO | 2005049251 A1 | 6/2005 |

OTHER PUBLICATIONS

EP Extended Search Report for Application No. 14186484.3 dated Mar. 19, 2015.
Library of Manufacturing, Sand Casting for Manufacture, Sand Casting; http://thelibraryofmanufacturing.com/metalcasting_sand.html.
Wu, Shuilin, et al; Pore formation mechanism and characterization of porous NiTi shape memory alloys synthesized by capsule-free hot isostatic pressing; ScienceDirect, Acta Materialia 55 (2007) 3437-3451; Copyright 2007.
Cardinal IP Search Report dated Jul. 31, 2013.
USPTO Office Action for U.S. Appl. No. 14/492,302 dated Apr. 14, 2017.

* cited by examiner

GAS TURBINE ENGINE ROTORS INCLUDING INTRA-HUB STRESS RELIEF FEATURES AND METHODS FOR THE MANUFACTURE THEREOF

TECHNICAL FIELD

The present invention relates generally to gas turbine engines and, more particularly, to embodiments of gas turbine engine rotors (e.g., compressor and turbine rotors) including intra-hub stress relief features, as well as to methods for producing gas turbine engine rotors having stress relief features.

BACKGROUND

A Gas Turbine Engine (GTE) typically includes a compressor section and a turbine section positioned upstream and downstream, respectively, of a combustion section. The compressor section and the turbine section each contain one or more bladed wheels or rotors, which are fixedly mounted to and rotate along with one or more shafts. A given GTE may include a single compressor rotor and a single turbine rotor linked by a single shaft; or, instead, multiple compressor rotors and turbine rotors linked by two or more concentric shafts and arranged in sequential flow stages. During GTE operation, the compressor rotor or rotors rotate to compress intake air, which is then supplied to the combustion section, mixed with fuel, and ignited to produce combustive gasses. The combustive gases are expanded through the turbine section to drive rotation of the turbine rotor or rotors and produce power. Compressor rotors and turbine rotors (collectively referred to herein as "GTE rotors") can be broadly divided into two general categories: axial rotors and radial rotors. In the case of a compressor rotor, the rotor is classified as either "axial" or "radial" depending upon the direction in which compressed airflow is discharged from the rotor. Conversely, in the case of a turbine rotor, the rotor is classified as "axial" or "radial" depending upon the direction in which combustive gases are received at the rotor inlet.

Radial turbine rotors can provide lower primary flow velocities, reduced sensitivity to tip clearances, and other performance advantages over comparable axial turbine rotors in many cases, such as when the turbine rotor falls within the one pound or less per second corrected flow class. Furthermore, as compared to similar axial turbine rotors, radial turbine rotors tend to have less complex designs, lower part counts, and correspondingly lower production costs. These advantages notwithstanding, the usage of radial turbine rotors has traditionally been restricted by durability limitations, such as Low Cycle Fatigue (LCF). Advances in materials and processing technologies have yielded significant increases in radial turbine rotor capability and durability over the past several decades; however, further improvements in the durability of radial turbine rotors are still desired to allow the usage of such rotors in high performance, long life applications.

There thus exists an ongoing need to provide embodiments of a radial turbine rotor having improved LCF properties and other measures of durability. In satisfaction of this need, the following provides embodiments of radial turbine rotors having unique stress relief features, which may be largely or wholly internal to the rotor hub and which may have relatively complex, curved geometries that vary in three dimensional space as taken along the rotational axis of the rotor. Further provided herein are embodiments of a method for manufacturing radial turbine rotors including such intra-hub stress relief features. While particularly useful in the production of radial turbine rotors, embodiments of the below-described manufacturing method can also be utilized to produce other bladed GTE rotors, including axial turbine rotors, axial compressor rotors, and radial compressor rotors. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a method for producing a Gas Turbine Engine (GTE) rotor including stress relief features are provided. In one embodiment, the method includes producing a hub preform in which a plurality of elongated sacrificial cores are embedded. Blades are attached to an outer circumference of the hub preform by, for example, bonding a blade ring to the outer circumference of the preform. The blades are spaced about the rotational axis of the GTE rotor and circumferentially interspersed with the plurality of elongated sacrificial cores. The plurality of elongated sacrificial cores are then removed from the hub preform to yield a plurality of stress distribution tunnels extending in the hub preform.

In a further embodiment, the manufacturing method includes forming a plurality of stress distribution channels in a rotor hub about which a plurality of rotor blades is circumferentially spaced. The stress distribution tunnels follow curved paths, which extends within the rotor hub between neighboring pairs of the rotor blades. The stress distribution tunnels are formed, at least in part, by embedding a plurality of elongated sacrificial cores in a hub preform at locations corresponding to the desired locations of the plurality of stress distribution channels; and then removing the sacrificial cores utilizing a chemical dissolution process. The method further includes the step or process of machining the hub preform to define the final geometry of the rotor hub.

Embodiments of a GTE rotor are still further provided herein. In one embodiment, the GTE rotor includes a rotor hub, a plurality of blades circumferentially spaced about the rotor hub and extending outward therefrom, and a plurality of stress distribution tunnels each extending through the rotor hub along a curved path. A plurality of stress relief slots is formed through an outer circumferential portion of the rotor hub between neighboring pairs of the plurality of blades and extends to the plurality of stress distribution tunnels. The plurality of stress relief slots may also twist about the rotational axis of the GTE rotor, as taken along the rotational axis in a fore-aft direction.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
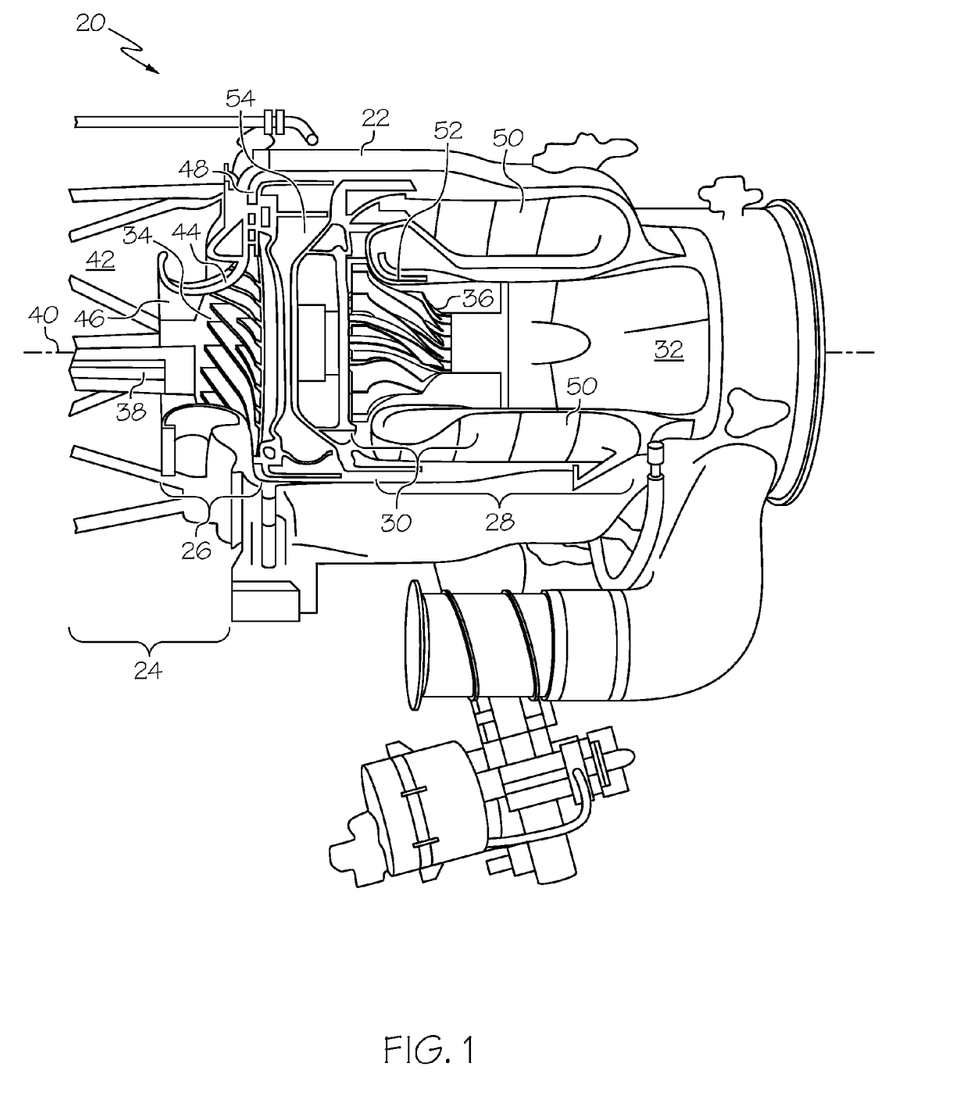
FIG. 1 is a cutaway view of a portion of an exemplary Auxiliary Power Unit (APU) containing a radial compressor rotor and a radial turbine rotor.

FIG. 1 is a cutaway view of a portion of an exemplary Gas Turbine Engine (GTE) and, specifically, an exemplary Auxiliary Power Unit (APU) 20. APU 20 includes a housing assembly 22 containing the following sections: (i) an intake section 24, (ii) a compressor section 26, (iii) a combustion section 28, (iv) a turbine section 30, and (v) an exhaust section 32. A radial compressor rotor 34 (also commonly referred to as a "centrifugal compressor rotor" or an "impeller") is positioned within compressor section 26, while a radial turbine rotor 36 (also commonly referred to as a "radial inflow turbine rotor") is positioned within turbine section 30. Rotors 34 and 36 may be positioned in relatively close axial proximity, but are partitioned by one or more intervening walls 54. Rotors 34 and 36 are each fixedly connected to a central shaft 38 utilizing, for example, a curvic-type coupling. Rotors 34 and 36 thus rotate in conjunction with shaft 38 about the rotational axis of APU 20 (represented in FIG. 1 by dashed line 40 and co-axial with the rotational axes of rotors 34 and 36). As indicated in FIG. 1, shaft 38 may also extend in a forward direction through intake section 24 to connect with a non-illustrated APU module supportive of one or more APU functionalities, such as the generation of power or pressurized airflow for cooling or main engine start purposes.

During operation of APU 20, air is drawn into the plenum 42 of intake section 24 through one or more inlets provided in an intake housing (not shown). From intake section 24, the intake air enters compressor section 26 and flows into radial compressor rotor 34, which may be surrounded by a shroud 44 including a bellmouth 46. The intake air is compressed by radial compressor rotor 34 to raise the temperature and pressure of the airflow. The hot, compressed airflow is then discharged radially outward from compressor rotor 34, flows through a curved flow passage or "diffuser" 48, and is directed into a conical or cylindrical combustion chamber 50 within combustion section 28. Within combustion chamber 50, the air is mixed with fuel and ignited to produce combustive gasses. The combustive gasses expand rapidly through turbine section 30 to drive the rotation of radial turbine rotor 36, which may also be circumscribed by a surrounding shroud 52. Rotation of radial turbine rotor 36 drives further rotation of shaft 38 and radial compressor rotor 34. The rotation of shaft 38 provides the power output of APU 20, which may be utilized for various purposes, such as driving the non-illustrated APU module described above. Finally, the combustive gas flow is discharged from APU 20 through exhaust section 32.

The usage of radial compressor rotor 34 and radial turbine rotor 36 within APU 20 provides certain advantages over the usage of axial compressor rotors and axial turbine rotors, respectively. With respect to radial turbine rotor 36, specifically, the radial inflow design of rotor 36 may provide lower primary flow velocities, reduced sensitivity to tip clearances, reduced part count, and/or reduced cost relative to a compared rotor having an axial inflow design. However, as described in the foregoing section entitled "BACKGROUND," the durability of radial turbine rotors has traditionally been limited due to, for example, undesirably rapid mechanical fatigue at relatively low life cycles. To overcome or at least mitigate such limitations, the following describes embodiments of a radial turbine rotor suitable for usage as radial turbine rotor 36 and including unique stress relief features within the rotor hub (referred to herein as "intra-hub stress relief features"), which reduce stress concentrations within the hub and along the blade-hub interfaces to improve rotor durability and operational lifespan. The following also describes embodiments of a manufacturing method suitable for producing radial turbine rotors and other bladed GTE rotors having intra-hub stress relief features. While described below primarily in the context of a particular GTE (i.e., APU 20 shown in FIG. 1) to establish an exemplary context in which embodiments of the radial turbine rotor may be better understood, it is emphasized that the GTE rotors produced utilizing the below-described fabrication method can be employed within various other types of gas turbine engines.

Figure 2:
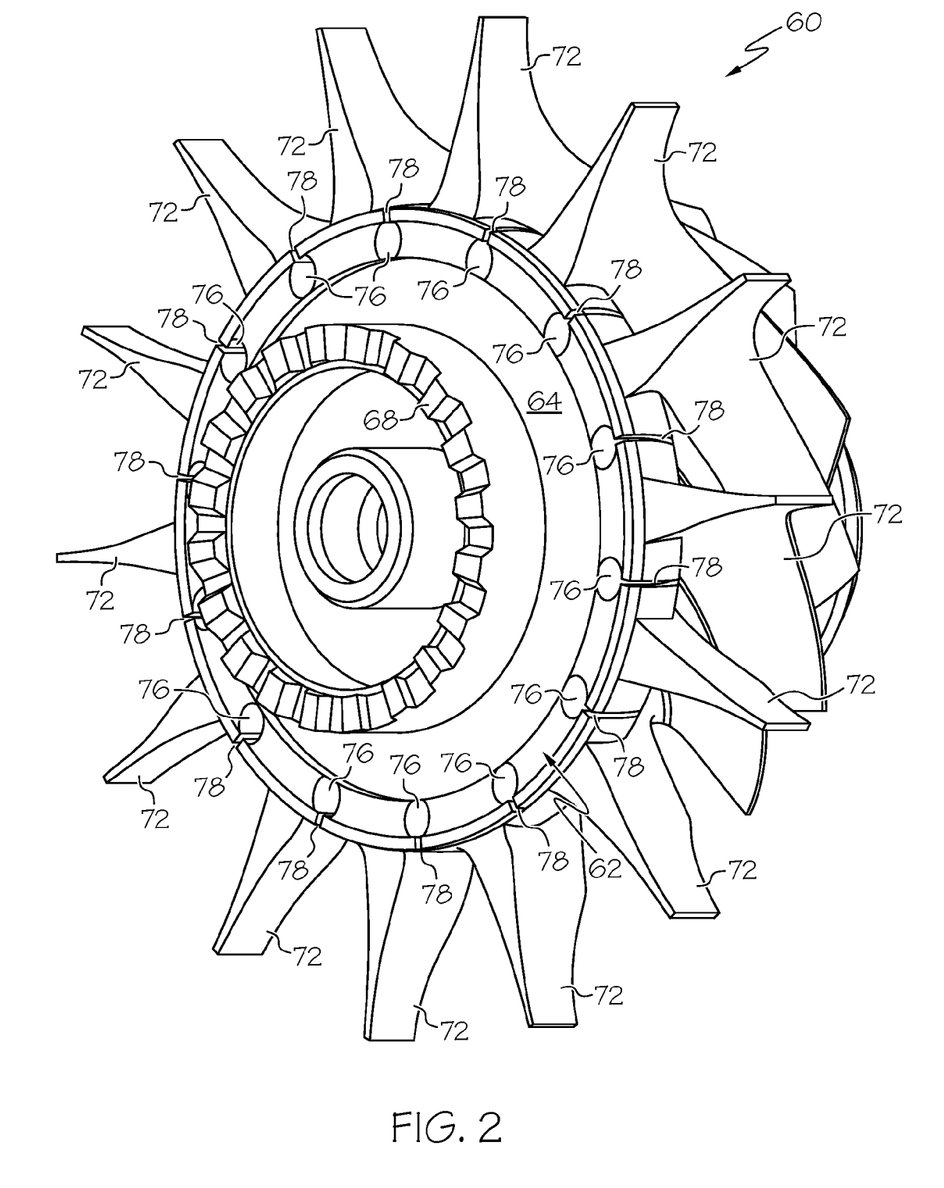
FIGS. 2, 3, and 4 are font isometric, side, and rear isometric views, respectively, a radial turbine rotor suitable for usage as the radial turbine rotor shown in FIG. 1 and including intra-hub stress relief features, as illustrated in accordance with an exemplary embodiment of the present invention.
Figure 3:
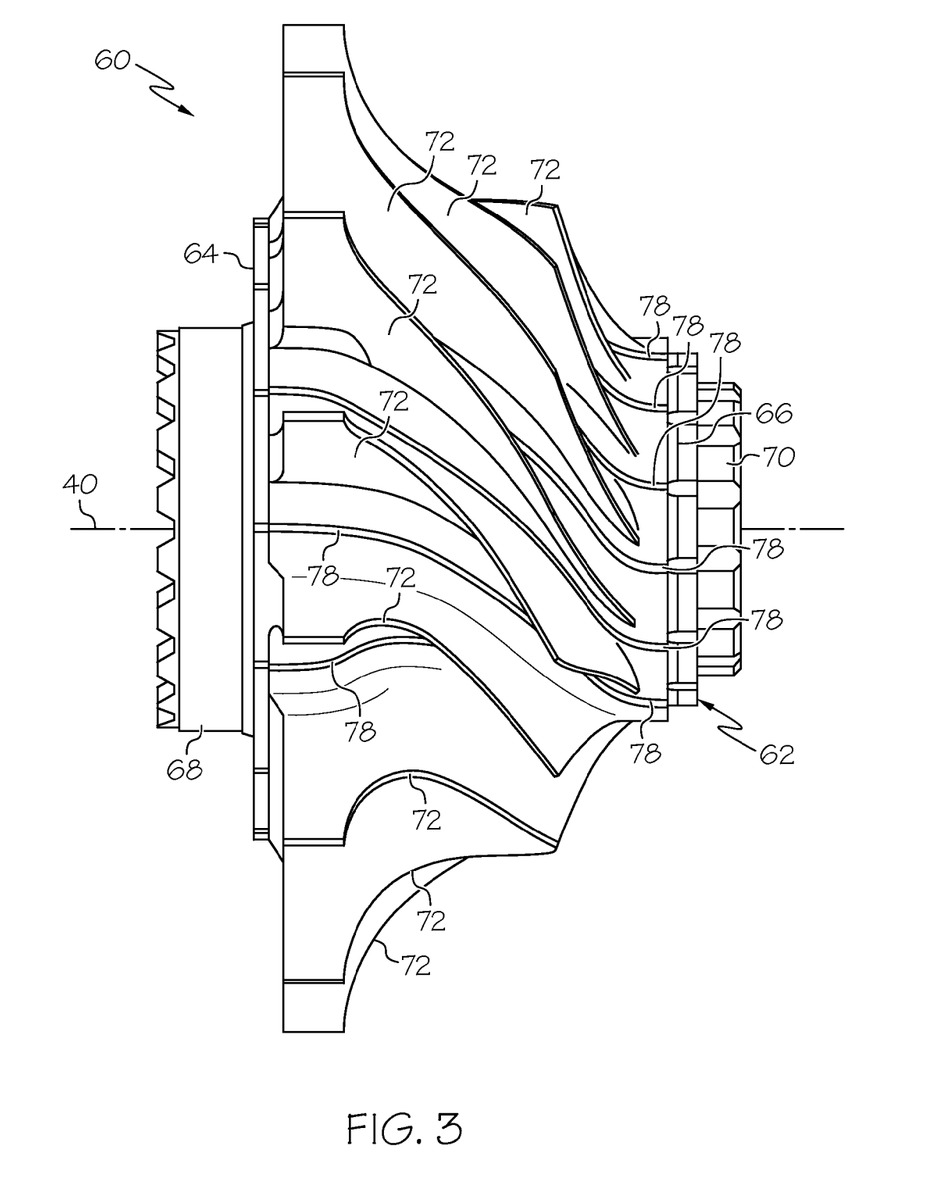
Figure 4:
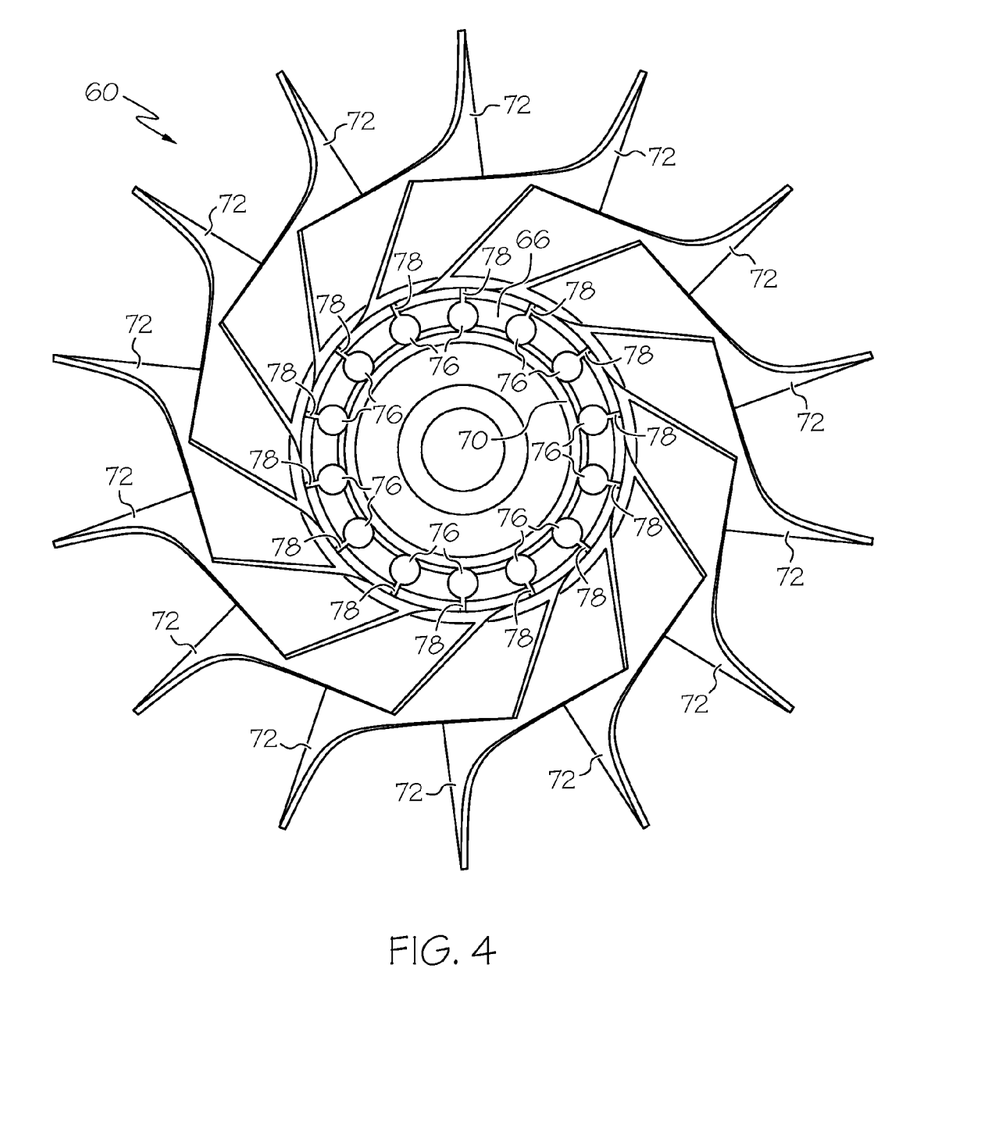

FIGS. 2, 3, and 4 are forward isometric, side, and aft isometric views of a radial turbine rotor 60, respectively, illustrated in accordance with an exemplary embodiment of the present invention. Radial turbine rotor 60 includes a central body or hub 62 having a large outer diameter ("OD") face 64 (FIG. 2) and an opposing small OD face 66 (FIG. 4). Large OD face 64 and small OD face 66 are the upstream and downstream faces, respectively, of radial turbine rotor 60 in the illustrated example; although it will be noted that rotor 60 can alternatively be utilized as a radial compressor rotor (e.g., radial compressor rotor 34 shown in FIG. 1) with relatively few modifications, in which case large OD face 64 would serve as the downstream face of rotor 34, while small OD face 66 would serve as the upstream face thereof. The upstream or "inducer" portion of radial turbine rotor 60 (the leftmost portion of rotor 60 in FIGS. 2 and 3) serves as the inlet of rotor 60 and receives combustive gas flow in a radially inward direction. Conversely, the downstream or "exducer" portion of radial turbine rotor 60 (the rightmost portion of rotor 60 in FIGS. 2 and 3) serves as the outlet of rotor 60 and discharges combustive gas flow in an axial direction.

Radial turbine rotor 60 is fixedly joined to a shaft when installed within a gas turbine engine, such as the central shaft 38 of APU 20 (FIG. 1). Large OD face 64 of rotor hub 62 may be fabricated to include a curvic-type coupling feature 68, such as an annular castellated extension, to facilitate such a rotationally-fixed coupling. As shown most clearly in FIG. 2, curvic 68 projects axially from rotor hub 62 in an upstream direction to engage a mating curvic formed within or affixed to the trailing end of shaft 38 (not shown). Small OD face 66 may likewise be fabricated to include one or more tubular or annular ledges 70, which project axially in a downstream direction to pilot to a mating connector piece when rotor 60 is installed within APU 20 or another GTE. The instant example notwithstanding, the particular manner in which radial turbine rotor 60 is mounted within APU 20 (or another gas turbine engine) will vary amongst different embodiments.

A plurality of rotor blades 72 is circumferentially spaced about rotor hub 62 and project outward therefrom. Blades 72 wrap or twist about the rotational axis of radial turbine rotor 60 (represented in FIG. 3 by dashed line 40). As shown most clearly in FIG. 3, rotor blades 72 follow the contour of the outer circumferential surface of hub 62, which gradually tapers downward in diameter when moving in a fore-aft direction; that is, when moving from the inducer portion of rotor hub 62 adjacent large OD face 64 toward the exducer portion of hub 62 adjacent small OD face 66. As rotor blades 72 follow the sloped contour of rotor hub 62, the blade-to-blade spacing decreases. The velocity of the combustive gas flow and the heat exposure of rotor hub 62 is typically highest in the region of radial turbine rotor 60 corresponding to the minimum blade-to-blade spacing (commonly referred to as the "throat region" of rotor 60). As a result, cracks may gradually develop within rotor hub 62 between blades 72 in the throat region if stress relief features are not provided to more uniformly distribute mechanical and thermal tangential/hoop stresses in this area. Cracks may also develop and propagate in other areas of rotor hub 62 (e.g., near the trailing edge of rotor hub 62 adjacent blades 72) if adequate stress relief features are not provided.

Figure 5:
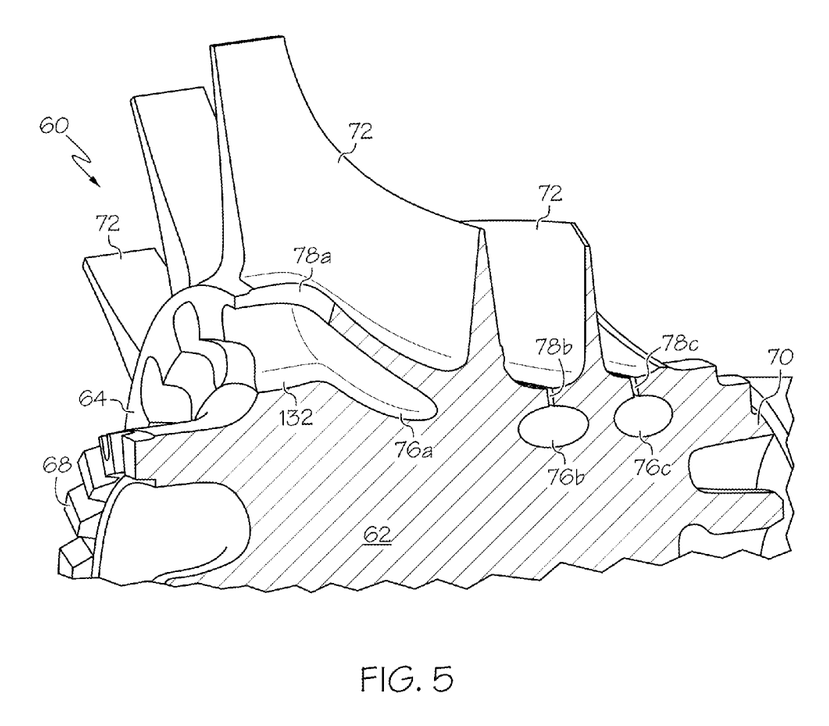
FIG. 5 is a cross-sectional view of an upper portion of the radial turbine rotor shown in FIGS. 2-4 illustrating one manner in which the stress relief features may twist about the rotational axis of the rotor when moving in a fore-aft direction.

To decrease the likelihood of crack formation within rotor hub 62 and thereby improve the overall durability and operational lifespan of rotor 60, radial turbine rotor 60 is further produced to include a number of intra-hub stress relief features. In the illustrated example, the intra-hub stress relief features are provided in the form of elongated stress distribution tunnels 76; the term "tunnel" denoting an elongated void or cavity that is least partially enclosed or buried within the rotor hub, as viewed from the exterior of rotor. Stress distribution tunnels 76 are interspersed with blades 72, as taken about the outer circumference of rotor 60. Stress distribution tunnels 76 thus extend within rotor hub 62 between neighboring of blades 72 or, more accurately, between the regions of rotor hub 62 located beneath adjacent blades 72. Stress distribution tunnels 76 extend from large OD face 64 (FIG. 2), through the body of rotor hub 62, and to small OD face 66 (FIG. 4). In so doing, tunnels 76 penetrate faces 64 and 66 shown in FIGS. 2 and 4, respectively. The cross-sectional shape and dimensions of tunnels 76 may remain substantially constant over their respective lengths. Alternatively, the cross-sectional shapes and dimensions of tunnels 76 can be varied over their respective lengths to optimize the stress concentration and associated low cycle fatigue life capability. For example, stress distribution tunnels 76 may be fabricated to include enlarged regions or pockets 132 (one of which is identified in FIG. 5, as described below) formed in inducer portion of radial turbine rotor 60 and exposed through large OD face 64 of hub 62. Pockets 132 may favorably reduce stress within the saddle region of radial turbine rotor 60 (i.e., i.e., the region of rotor hub 62 near the blade-hub interface of the inducer section of rotor 60) to bring about further improvement in rotor durability and lifespan.

Rotor hub 62 is fabricated to further include a plurality of stress relief slots 78, which extend from the outer circumferential surface of rotor 60 to stress distribution tunnels 76. Stress relief slots 78 may be formed as radially-penetrating channels or slits, which have widths less than the diameters of stress distribution tunnels 76. Stress relief slots 78 expose small portions of tunnels 76, as viewed from the exterior of rotor 60; however, the majority of stress distribution tunnels 76 remain buried or enclosed within the body of rotor hub 62 such that no direct line-of-sight is provided thereto. Stress relief slots 78 are formed in an outer circumferential surface of hub 62 to reduce mechanical and thermal tangential/hoop stresses around hub 62. Stress distribution tunnels 76 serve to more uniformly distribute stress that would otherwise occur near the bottom of slots 78 across a larger region of the parent material of rotor hub 62. In this manner, stress relief slots 78 and intra-hub stress distribution tunnels 76 cooperate to reduce stress risers and decrease fatigue in these regions to thereby reduce the likelihood of crack formation and propagation during operation of rotor 60. Stress distribution tunnels 76 may have any cross-sectional geometry suitable for performing this function; e.g., as indicated in FIGS. 2-4, tunnels 76 may be produced to have a generally circular, ovular, or teardrop-shaped cross-sectional geometry.

Stress distribution tunnels 76 and stress relief slots 78 generally follow the contour of the valley regions of rotor hub 62 located between the regions of hub 62 immediately below the roots or bases of blades 72. The curved paths followed by tunnels 76 and slots 78 are thus substantially parallel to the twisting, curved paths followed by blades 72; although it will be appreciated that the paths followed by tunnels 76 are angularly staggered and offset in a radially inward direction as compared to the paths followed by blades 72. The paths followed by tunnels 76 and slots 78 curve or bend in multiple dimensions, when moving along rotor hub 62 in a fore-aft direction (from the left to the right in FIGS. 2 and 3). In the case of radial turbine rotor 60, specifically, stress distribution tunnels 76 and stress relief slots 78 twist around the rotational axis 40 of rotor 60 (FIG. 3), when moving in a fore-aft direction, in essentially the same manner as do blades 72. Tunnels 76 and slots 78 also converge radially inward toward the rotational axis 40 of rotor 60 (FIG. 3) as they progress through rotor 62. The curved and winding nature of the paths followed by tunnels 76 and slots 78 can more readily appreciated by referring to FIG. 5, which is a cross-sectional view of an upper portion of radial turbine rotor 60 illustrating three neighboring stress distribution tunnels 76(*a*), 76(*b*), and 76(*c*). As may be appreciated most readily for tunnel 76(*b*), tunnels 76 extend beneath the valley regions of rotor hub 62 located between neighboring blades 72, which twist and converge toward the centerline of hub 62 when moving in a fore-aft direction.

Stress relief slots 78 may be produced utilizing a conventionally-known material removal technique, such as EDM plunging. However, EDM plunging and other known line-of-sight material removal techniques, such as drilling, are generally incapable of producing stress distribution tunnels 76 due to the buried or enclosed nature of tunnels 76 and the non-linear paths followed thereby. An example of a manufacturing method enabling the fabrication of stress distribution tunnels 76 (or other such internal stress relief features) in addition to stress relief slots 78 will now be described in conjunction with FIGS. 6-10. While described below in conjunction with the manufacture of exemplary radial turbine rotor 60, specifically, it is emphasized that the below-described fabrication method can be utilized to produce other types of GTE rotors, such as axial turbine rotors, radial compressor rotors, and axial compressor rotors, having intra-hub stress relief features. Furthermore, the fabrication steps described below can be performed in alternative orders, certain steps may be omitted, and additional steps may be performed in alternative embodiments. Certain steps in the manufacture of GTE rotors may be well-known and, in the interests of brevity, will only be mentioned briefly herein or will be omitted entirely without description of the well-known process details.

Figure 6:
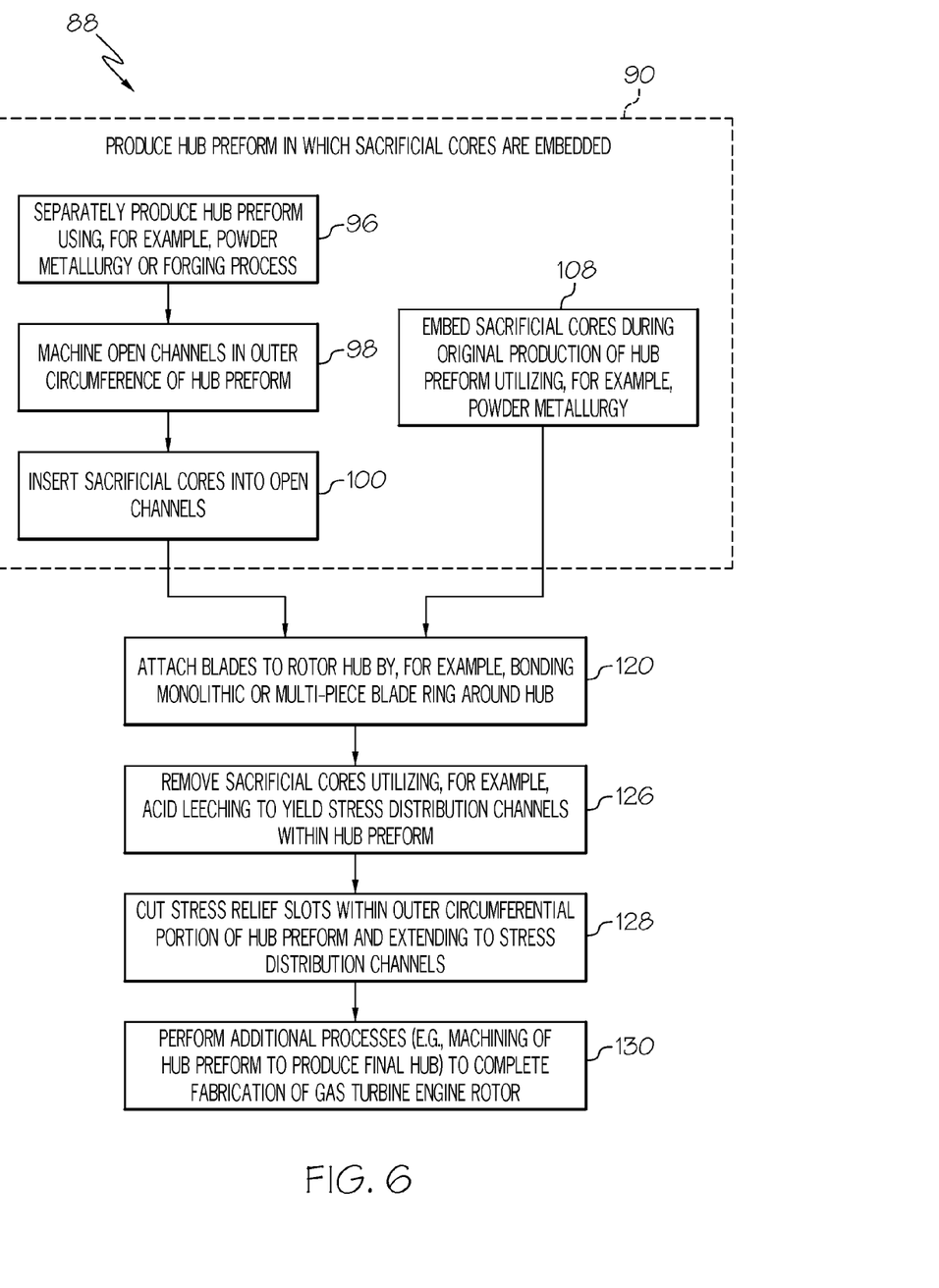
FIG. 6 is a flowchart setting-forth an exemplary method suitable for producing the radial turbine rotor shown in FIGS. 2-5 or another gas turbine engine rotor having intra-hub stress relief features, as illustrated in accordance with an exemplary embodiment of the present invention.
Figure 7:
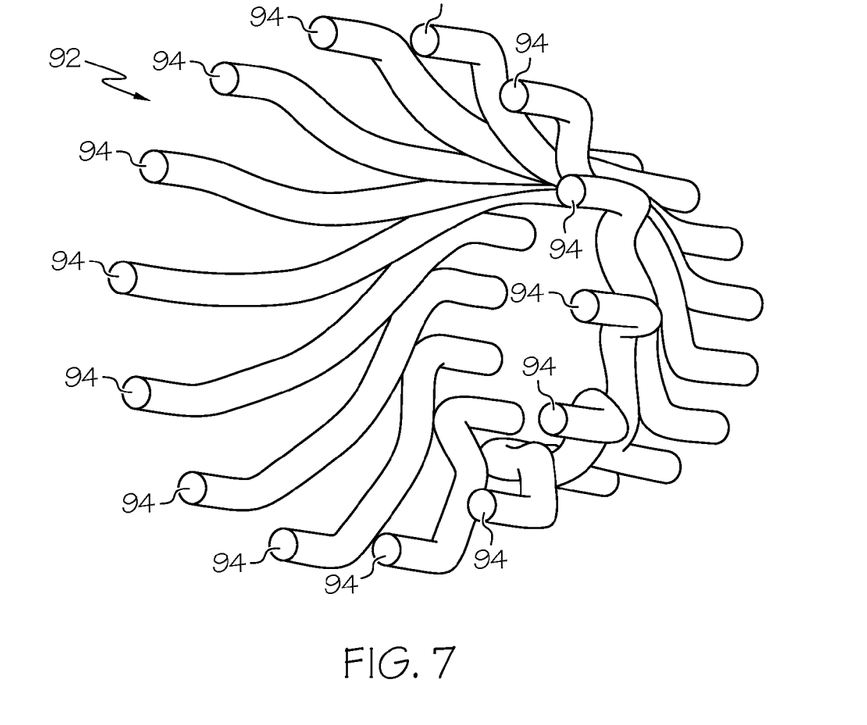
FIGS. 7-10 illustrate the radial turbine rotor shown in FIGS. 2-5 at various stages of manufacture and produced in accordance with the exemplary manufacturing method set-forth in FIG. 6.

Turning now to FIG. 6, exemplary manufacturing method 88 commences with the production of a rotor hub preform in which a number of elongated fugitive bodies or sacrificial cores are embedded (PROCESS BLOCK 90). As appearing herein, the term "rotor hub preform" refers to a body or mass of material, which undergoes further processing to produce the final rotor hub, such as rotor hub 62 shown in FIGS. 2-5. For example, the rotor hub preform may be produced to have a near net shape and undergo machining to define the final, more refined geometry of the rotor hub; e.g., machining of the hub preform may define the features of opposing faces 64 and 66 shown in FIGS. 2 and 4, respectively. As further appearing herein, the term "sacrificial core" generally refers to a body or member that can be selectively removed from the hub preform without causing significant material loss from or other damage to the hub preform. In many embodiments, the sacrificial cores will each have an elongated, cylindrical shape similar to that of a solid or hollow pipe, which follows a curved path through the hub as described in detail below.

The sacrificial cores embedded within the hub preform during STEP 90 of exemplary method 88 (FIG. 6) are preferably fabricated to have dimensions and cross-sectional shapes corresponding to the desired dimensions and cross-sectional shapes of stress distribution tunnels 76. Similarly, the sacrificial cores are produced to follow curved paths and are embedded within the hub preform at locations corresponding to the desired paths and locations of tunnels 76, respectively, in the completed rotor hub. This may be more fully appreciated by referring to FIG. 7, which is an isometric view of a circumferentially-spaced array 92 of sacrificial cores 94 that may be embedded in the hub preform (not shown for clarity) to produce stress distribution tunnels 76 shown in FIGS. 2-5. As can be seen, elongated cores 94 follow curved paths that twist about the centerline of rotor hub 92 and which converge radially inward in a fore-aft direction (from the left to the right in FIG. 7) in essentially the same manner as do stress distribution tunnels 76 described above in conjunction with FIGS. 2-5.

The sacrificial cores can be composed of any material allowing selective removal over the parent material of the hub preform, which may be a nickel- or cobalt-based superalloy or other high temperature material. In one embodiment, the sacrificial cores are composed of a ceramic material or an alloy that can be selectively removed from the hub preform utilizing a chemical dissolution process; e.g., by way of non-limiting example only, the cores may be composed of a mild or low carbon steel, which can be removed utilizing an acid leeching process of the type described below. If desired, a coating material may be applied over the exterior of the sacrificial cores to reduce potential bonding with the hub perform and/or to impart a desired surface finish to the tunnels produced or revealed by the below-described removal of the sacrificial cores. In this case, the coating material may applied by dipping followed by a drying or heat treat cycle. Coating materials suitable for this purpose may include, but are not limited to, zirconia, silica, and zircon.

Figure 8:
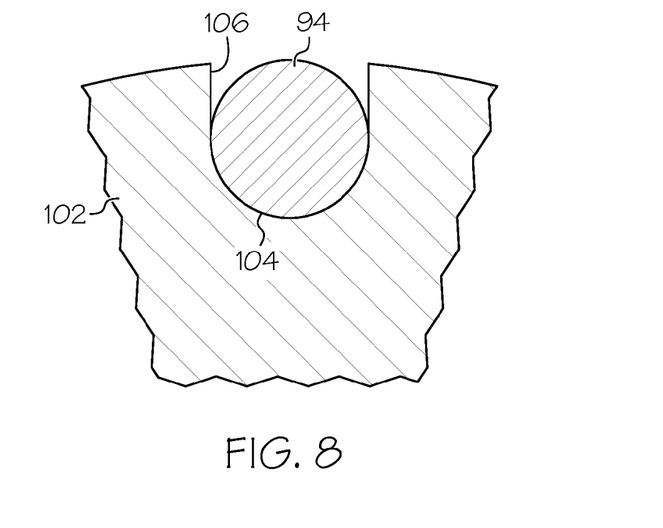

Different processes can be utilized to embed sacrificial cores 94 (FIG. 7) within the hub preform during PROCESS BLOCK 90 of exemplary method 88. In one embodiment, the hub preform is initially produced as a discrete body or mass by, for example, casting, forging, or metallurgical consolidation of metal powders (STEP 96, FIG. 6). Recesses or open channels are formed in the outer circumference of the hub preform at locations corresponding to the desired locations of stress distribution tunnels 76 (FIGS. 2-5). The open channels are preferably formed to have to have substantially rounded bottoms having dimensions slightly larger than cross-sectional dimensions of cores 94, which are inserted into the channels as described below. In instances wherein the hub preform is produced by casting, by sintering metal powders, or utilizing a similar process, the open channels can be formed within the hub preform during initial manufacture as, for example, negative features within a mold or container defining the shape of the hub preform. Alternatively, as indicated in FIG. 6, the hub preform may be produced without the open channels, and the channels may be subsequently machined into the outer circumference of the hub preform (STEP 98, FIG. 6). In either case, the sacrificial cores are then inserted into the open channels; and, if needed, bonded, tack welded, or otherwise secured in place (STEP 100, FIG. 6). The resultant structure is shown in FIG. 8, which illustrates a portion of a hub preform 102 having a machined recess or open channel 104 into which a sacrificial core 94 has been inserted. As indicated in FIG. 8, channel 104 may have a substantially rounded bottom and an open mouth 106 to allow the insertion of core 94. The open mouths 106 of channels 104 may pinch off or collapse around sacrificial cores 94 during subsequent processing, such as during the below-described Hot Isostatic Pressing (HIP) process. Similarly, free space or voiding between channels 104 and cores 94 may be eliminated, such that sacrificial cores 94 generally determine the final geometries of the stress distribution tunnels.

Figure 9:
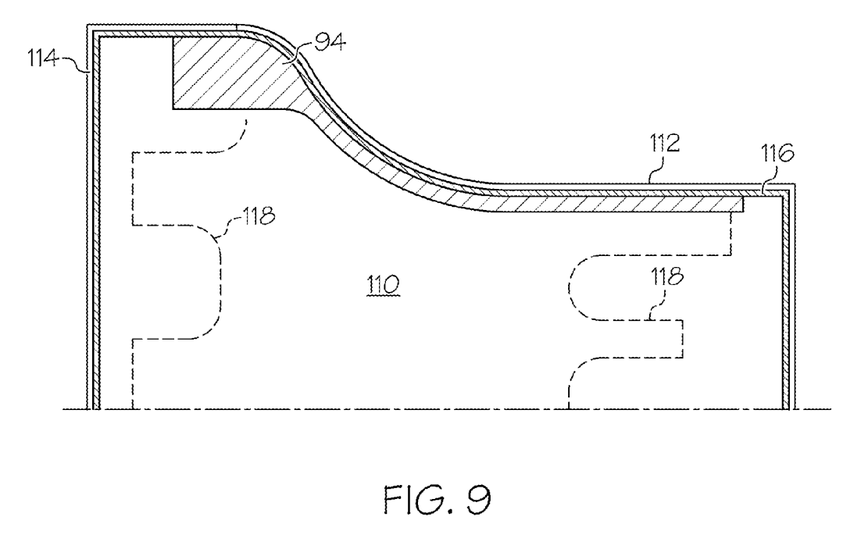

In a second embodiment, sacrificial cores 94 are embedded within the rotor hub preform during initial production of the hub preform. In this case, a powder metallurgy process may be utilized wherein sacrificial cores 94 are first produced and then positioned within a body or bed of metallic powder held within a container (STEP 108, FIG. 6). The powder bed is then sintered or consolidated around elongated cores 94 to produce the hub preform in which cores 94 are embedded. If desired, the sacrificial cores 94 can be rigidly joined or physically tied together in the desired spatial array. This is conveniently accomplished by welding, soldering, or otherwise attaching the terminal ends of cores 94 to a connector piece to yield an interconnected array or "spider" maintaining the relative positioning of cores 94. In embodiments wherein the metallic powders are consolidated within a HIP container, the sacrificial cores 94 may be attached to the lid of the HIP container or otherwise index to the HIP container in a manner that ensures proper positioning of cores 94 within the powder bed or body. Further emphasizing this point, FIG. 9 is a cross-sectional view of an upper portion of a hub preform 110 having a number of sacrificial cores 94 embedded therein (one of which can be seen in FIG. 9), which may be produced by consolidation of metallurgical powders within a HIP container 112. In this example, HIP container 112 includes a lid 114 to which cores 94 are affixed to produce a spider, which is immersed in the powder bed prior to sintering. If desired, the terminal ends of cores 94 may be fabricated to include indexing features 116, which pilot to corresponding features provided within HIP container 112 to ensure proper angular positioning of the spider. Dashed lines 118 are further shown in FIG. 9 to generally demarcate the final geometry of hub 62 (FIGS. 2-5), as defined by machining during STEP 130 of method 88. Sacrificial cores 94 may or may not be exposed through the outer surface of hub preform 110 following the sintering or powder consolidation process.

Figure 10:
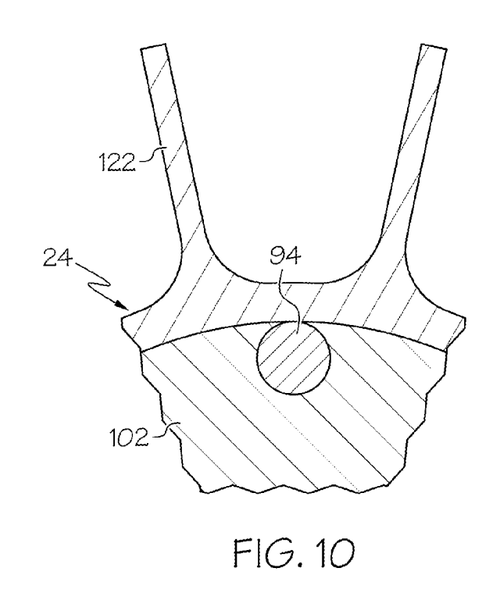

After production of a hub preform containing embedded sacrificial cores 94 (PROCESS BLOCK 90, FIG. 6), blades are attached to the hub preform such that the blades are spaced about the rotational axis of the rotor and interspersed with the plurality of elongated sacrificial cores, as taken about the circumference of the preform. In a preferred embodiment, and as indicated in FIG. 6, this is accomplished by bonding a blade ring to the hub preform (STEP 120, FIG. 6). In preparation for bonding, the inner circumference of the blade ring and the outer circumference of the hub preform may be machined and cleaned. The blade ring may then be positioned around the outer circumference of the hub preform and over sacrificial cores 94, if exposed through the hub preform. The annular interface between the end regions of the blade ring and the hub preform may be sealed utilizing, for example, a vacuum brazing process. A HIP process may then be utilized to diffusion bond the blade ring to the hub preform during STEP 120 of exemplary method 88. FIG. 10 illustrates a small portion of a hub preform 122, which may correspond to hub preform 102 shown in FIG. 8 or hub preform 110 shown in FIG. 9, after positioning of a blade ring 124 (partially shown) over preform 110 and over cores 94 embedded therein. The foregoing notwithstanding, it is noted that a blade ring or individual blades may be affixed to the hub preform utilizing other techniques, as well, including other bonding processes (e.g., brazing) and/or utilizing an interlocking mechanical interface (e.g., a fir tree interface).

The blade ring attached to the hub preform 110 during STEP 120 of exemplary method 88 (FIG. 6) can be produced as a single piece, monolithic casting; or, instead, by bonding (e.g., brazing, welding, or diffusion bonding) multiple separately cast pieces together to form the ring. Notably, in the latter case, each blade (or sub-sets of the blades) can be cast from a single crystal superalloy having an optimal crystallographic orientation, and the individual blades can then be diffusion bonded or otherwise joined together to produce the blade ring. By casting smaller volume pieces, more complex casting features (e.g., internal flow passages) can also be created, while minimizing voiding and other defects within the casting. The joints between the individually-cast blade pieces need only have sufficient structural integrity for the blade-hub joining process due to the subsequent formation of stress relief slots 78 (FIGS. 2-6), which may be cut through the joint locations. The foregoing notwithstanding, embodiments of the GTE rotor manufacturing method described herein are by no means limited to the particular manner in which the blade ring is produced.

In the above-described exemplary embodiments, the blades or the blade ring was attached subsequent to the production of the rotor hub preform. This provides the advantages noted above, as well as the ability to produce the rotor hub and the rotor blades from different materials to produce a so-called "dual alloy" rotor. These advantages notwithstanding, the rotor blades or blade ring may be attached to the rotor hub preform during initial production thereof in further embodiments of the GTE rotor manufacturing method. For example, in embodiments wherein the hub preform is produced utilizing a casting, powder consolidation, or similar process, the blade ring may be positioned within the mold, HIP container, or the like and the rotor hub preform thereover or in bonded contact therewith. In still further embodiments, the rotor hub preform may be produced to include integral blade preforms (e.g., radially-projecting blocks of material), which are subsequently machined to define the final rotor blades, such as rotor blades 72 shown in FIGS. 2-5.

Advancing to STEP 126 of exemplary method 88 (FIG. 6), sacrificial cores 94 are next removed to yield stress distribution tunnels 76 (FIGS. 2-5). As appearing herein, the "yield" is utilized to refer to the production of stress distribution tunnels 76 in their final form, unoccupied by cores 94. As noted above, stress distribution tunnels 76 may be fabricated to include enlarged regions or pockets 132 (one of which is identified in FIG. 5) formed in inducer portion of radial turbine rotor 60 and exposed through large OD face 64 of hub 62. Enlarged pockets 132 are conveniently produced by imparting cores 94 with enlarged terminal ends proximate the inducer section of rotor 60, which produce pockets 132 when cores 94 are removed during STEP 126 of exemplary method 120. As previously described, and depending upon the material from which cores 94 and the rotor hub preform are produced, sacrificial cores 94 may be conveniently removed utilizing chemical dissolution; e.g., by submerging the partially-completed rotor in an acid bath. For example, in embodiments wherein sacrificial cores 94 are composed a mild or low carbon steel, an acid leeching process may be employed to remove cores 94 by exposure to a nitric acid and/or hydrofluoric acid solution. In this case, the partially-completed turbine rotor 60 may be submerged in an acid bath, which may agitated to promote the inflow of the acid and dissolution of cores 94.

After removal of sacrificial cores 94, stress relief slots 78 may be formed in an outer circumferential portion of rotor hub 62 (STEP 128, FIG. 6). Stress relief slots 78 are conveniently formed utilizing EDM plunging or other machining technique. As described in detail above, stress relief slots 78 are formed to extend to stress distribution channels 76. In further embodiments, stress relief slots 78 may be formed prior to the removal of sacrificial cores 94. To complete exemplary method 88 (FIG. 6), additional conveniently-known processes can be carried-out (STEP 130, FIG. 6). In this case of radial turbine rotor 60, such additional processes may include machining to impart hub 62 with the final geometry shown in FIGS. 2-5. Additionally, an Environmental Barrier Coat (EBC), a Thermal Barrier Coat (TBC), or other coating systems or layer may be produced over the outer surface of blades 72 and/or hub 62; e.g., in one embodiment, an EBC coating is formed over all the gas path surfaces of completed radial turbine rotor 60.

The foregoing has thus provided embodiments of a GTE rotor including stress relief features formed in the rotor hub, such as stress distribution tunnels extending through the rotor hub along curved paths. In embodiments wherein the GTE rotor assumes the form of a radial turbine rotor, the stress distribution tunnels may twist about the rotational axis of the rotor and converge toward the rotational axis of the rotor of the rotor, when moving in a fore-aft direction. Stress relief slots may likewise be cut or otherwise in the outer circumference of the rotor hub and extend to the underlying stress distribution tunnels. Collectively, the stress distribution tunnels and the stress relief slots may favorably increase the durability and operational lifespan of the radial turbine rotor and permit usage of the rotor in high performance, long life applications. In further embodiments, the GTE rotor may be implemented as an axial turbine rotor, a radial compressor rotor, or an axial compressor rotor. The foregoing has also described embodiments of a manufacturing method for producing a GTE rotor having stress distribution tunnels or other stress relief features located within the rotor hub.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A method for manufacturing a gas turbine engine (GTE) rotor having a rotational axis, the method comprising:
   producing a hub preform in which a plurality of elongated sacrificial cores is embedded;
   attaching blades to an outer circumference of the hub preform, the blades spaced about the rotational axis of the GTE rotor and circumferentially interspersed with the plurality of elongated sacrificial cores; and
   removing the plurality of elongated sacrificial cores from the hub preform to yield a plurality of stress distribution tunnels extending in the hub preform;
   wherein the plurality of elongated sacrificial cores is elongated along the rotational axis of the GTE rotor, and wherein the plurality of elongated sacrificial cores and the plurality of stress distribution tunnels follow curved paths that twist about the rotational axis of the GTE rotor and which converge radially inward when moving in a fore-aft direction.

2. The method of claim 1 further comprising forming stress relief slots through an outer circumferential portion of the hub preform between neighboring pairs of blades and extending to the plurality of stress distribution tunnels.

3. The method of claim 2 wherein the plurality of stress distribution tunnels have diameters greater than the widths of the stress relief slots.

4. The method of claim 1 wherein the plurality of elongated sacrificial cores is circumferentially spaced about a centerline of the hub preform in an annular array.

5. The method of claim 1 wherein removing the plurality of elongated sacrificial cores comprises chemically dissolving the plurality of elongated sacrificial cores.

6. The method of claim 5 wherein the plurality of elongated sacrificial cores comprises one of the group consisting of an alloy and a ceramic material, and wherein the plurality of elongated sacrificial cores is chemically dissolved by acid leeching.

7. The method of claim 1 further comprising machining the hub preform to produce a rotor hub having a large outer diameter face and a small outer diameter face, and wherein the plurality of stress distribution tunnels extends through the rotor hub to penetrate the large outer diameter face and the small outer diameter face of the rotor hub.

8. The method of claim 7 wherein plurality of elongated sacrificial cores is fabricated to include enlarged terminal ends, and wherein removal of the plurality of elongated sacrificial cores results in the production of enlarged pockets in the larger outer diameter face of the rotor hub.

9. The method of claim 1 wherein attaching blades to an outer circumference of the hub preform comprises bonding a blade ring to the outer circumference of the hub preform.

10. The method of claim 9 wherein the plurality of elongated sacrificial cores is exposed through an outer circumferential surface of the hub preform, and wherein the method further comprises positioning the blade ring over the plurality of elongated sacrificial cores prior to bonding the blade ring to the hub preform.

11. The method of claim 1 wherein producing the hub preform comprises:
   fabricating the hub preform to include a plurality of open channels in the outer circumference thereof; and
   inserting the plurality of elongated sacrificial cores into the plurality of open channels.

12. The method of claim 11 wherein the plurality of elongated sacrificial cores is joined as a spider.

13. The method of claim 12 further comprising fabricating the plurality of elongated sacrificial cores to include terminal ends having indexing features, which pilot to corresponding features of a hot isostatic pressing container.

14. The method of claim 1 wherein producing a hub preform comprises:
   positioning the plurality of elongated sacrificial cores in a bed of metallic powder; and
   sintering the bed of metallic powder to produce the hub preform in which the plurality of elongated sacrificial cores is embedded.

15. A gas turbine engine (GTE) rotor having a rotational axis, the GTE rotor comprising:
   a rotor hub;
   a plurality of blades circumferentially spaced about the rotor hub and extending outward therefrom;
   a plurality of stress distribution tunnels extending through the rotor hub along curved paths; and
   a plurality of stress relief slots formed through an outer circumferential portion of the rotor hub between neighboring pairs of the plurality of blades and extending to the plurality of stress distribution tunnels;
   wherein the plurality of stress distribution tunnels is elongated along the rotational axis of the GTE rotor, and wherein the plurality of stress distribution tunnels and the plurality of stress relief slots twist about and converge toward the rotational axis of the GTE rotor, when progressing along the GTE rotor in a fore-aft direction.

16. A method for manufacturing a gas turbine engine (GTE) rotor having a rotational axis, the method comprising:
   producing a hub preform having open channels formed in an outer circumference of the hub preform at desired locations of a plurality of stress distribution tunnels;
   embedding a plurality of elongated sacrificial cores in the hub preform by inserting the plurality of elongated sacrificial cores into the open channels after production of the hub preform;
   attaching blades to the outer circumference of the hub preform after embedding the plurality of elongated sacrificial cores in the hub preform, the blades spaced about the rotational axis of the GTE rotor and circumferentially interspersed with the plurality of elongated sacrificial cores; and
   removing the plurality of elongated sacrificial cores from the hub preform to yield the plurality of stress distribution tunnels extending in the hub preform.

17. The method of claim 16 wherein the open channels are produced to have open mouths and rounded bottoms, and wherein the plurality of elongated sacrificial cores is inserted into the open channels through the open mouths.

18. The method of claim 16 wherein the blades are attached to the hub preform as a blade ring, which is positioned over the plurality of elongated sacrificial cores after insertion into the open channels and then bonded to the outer circumference of the hub preform.

\* \* \* \* \*